United States Patent Office 2,865,164
Patented Dec. 23, 1958

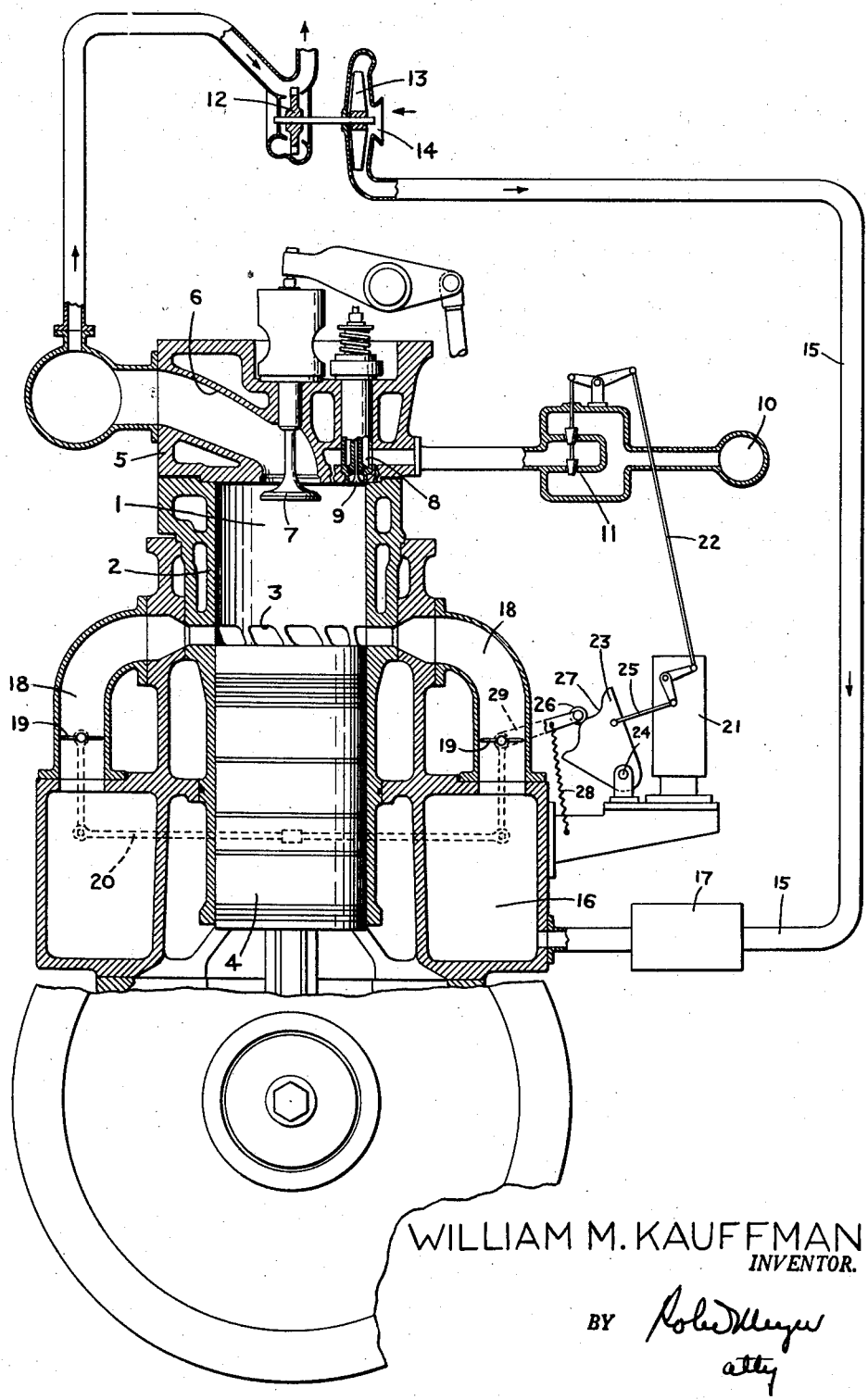

2,865,164

AIR FUEL CONTROL FOR TWO-CYCLE TURBO-CHARGED SPARK IGNITION GAS ENGINES

William M. Kauffmann, Hamburg, N. Y., assignor to Worthington Corporation, Harrison, N. J., a corporation of Delaware Application April 14, 1954, Serial No. 423,164

2 Claims. (Cl. 60—13)

This invention relates to turbocharged two-cycle spark ignition gas engines and more particularly to means for providing the optimum air fuel ratio for such engines from starting and "no load" conditions to full load operating conditions.

In turbocharged two-cycle spark ignition gas engines the air delivery of the turbocharger at light loads or at no load of the engine is excessive to maintain correct air fuel ratio for reliable ignition of the mixture. By enriching the mixture at such loads smooth operation of the engine may be obtained.

It has been determined by tests that the ignition limit of air fuel or air gas proportion is approximately 20 to 1 for natural gas. If it is assumed that an engine is operating on such gas then the practical, desirable air to gas ratio at full load operating conditions of the engine should be approximately 17 to 1. Such a proportionate mixture is too lean for efficient smooth operation of the engine at partial or light load operating conditions and must be reduced as the load on the engine is reduced, particularly below half load.

In starting a turbocharged two-cycle spark ignition gas engine, the usual method is to drive a positive displacement blower to supplement the turbocharger for starting, such supplementary positive displacement blower being required because the ordinarily low temperature of the exhaust gases of such engines is not sufficient to provide the necessary energy to accelerate the impeller of the turbocharger at starting conditions of the engine.

By properly regulating the quantity of air delivered to the engine cylinders, to provide the proper air fuel ratio, the optimum exhaust temperature for operating the turbine of the turbocharger directly from the engine exhaust, without aid of external means such as a supplementary blower, is possible for the load range of the engine.

Since no load and light load operations are the most critical requirements, the possibility of substaining combustion and carrying applied load with the turbocharger only during these periods is thus achieved.

With these and other objects in view as may appear from the accompanying specification, the invention consists of various features of construction and combination of parts, which will be described in connection with the accompanying drawing, showing a diagrammatic view, partly in section, of a two-cycle spark ignition gas engine embodying the air fuel ratio control mechanism.

Referring particularly to the drawings, 1 indicates the combustion chamber of a two-cycle turbocharged spark ignition gas engine of the type having what is known as a straight through scavenging system, that is, the engine cylinder 2 is provided with a ring of air inlet ports 3 located at the point of lower limit of movement of the piston 4, through which the air enters the combustion chamber 1. The head 5 of the cylinder 2 is provided with an exhaust passage 6 controlled by an exhaust valve 7 through which the burnt gases pass to exhaust.

The fuel or gas which is mixed with the air in the combustion chamber 1 of the engine enters the combustion chamber 1 through a fuel inlet passage 8 in the head of the engine. The fuel inlet passage 8 is controlled by the injection valves 9 and the delivery of gas to the injection valves 9 is from the gas intake manifold 10 through the governor controlled fuel metering valves 11 to each cylinder.

In a turbocharged engine of the type constituting the present invention the exhaust gases pass to the turbine 12 of the turbocharger and rotate the turbine for operating the blower or compressor 13. Ambient air is drawn into the suction 14 of the blower 13 and such air is discharged through the conduit 15 into the air manifold 16. It may be desirable to position a surface type air cooler 17 in the air conduit 15. It is understood that the turbocharger consisting of the turbine 12 and blower 13 and the air cooler 17 may be of any approved type such as now commonly in use and which may be purchased upon the open market.

In the form of the invention shown in the drawings two inlet air passages 18 are shown communicating with the air manifold 16 and delivering air to the combustion chamber 1 through the air inlet opening 3 but it is to be understood that the invention is not to be limited to the use of any specific number of such air passages.

Rotary or butterfly valves 19 are positioned in the air passages 18 and these valves are connected for synchronous unitary operation by means of a connecting or coupling rod 20.

In the ordinary or usual operation of turbocharged two-cycle spark ignition gas engines such valves 19 are not employed and the amount of air delivered to the combustion chamber of the engine varies with the load on the engine due to variances in speed of operation of the turbocharger. Such speed of operation of the turbocharger is a direct result of the load conditions on the engine resulting in variances in the temperature and quantity of exhaust gases delivered to the turbine 12. There is no means provided in such engines for varying the proportionate ratio of air to gas at varying speeds or load operating conditions of the engine, the operation of the engine being controlled from the governor 21 of the engine through suitable mechanism indicated at 22 which controls the operation of the fuel metering valve 11.

The present invention embodies means for varying the quantity of air in proportion to the quantity of fuel or gas delivered to the engine in accordance with the load conditions on the engine so that either upon starting of the engine or when the engine is operating at light loads the quantity of air delivered to the engine or combustion chamber will be reduced in proportion to the quantity of gas delivered to the combustion chamber thus providing a richer mixture in the combustion chamber at such times both to permit smooth operating conditions of the engine and to provide a temperature of the exhaust gases sufficient to provide the necessary energy to accelerate the impeller of the turbine.

The valves 19 are operated to control the air gas ratio in the combustion chamber 1 and they are operated from the governor 21 of the engine through the medium of a cam 23. The cam 23 is pivotally mounted as shown at 24 and is connected to the governor by an articulated lever arrangement 25 so that it will be moved upon its pivot 24 by operation of the governor. A roller 26 rolls upon the land 27 of the cam and is held thereagainst by a spring 28. The roller 26 is connected by a suitable arm 29 with the rocker shaft of one of the valves 19 so as to rock or rotate the valve upon movement of the roller over the land 27 of the cam. The coupling rod 20 provides synchronous unitary movement of both valves 19. The land 27 of the cam is so constructed and arranged as to provide operation of the valves 19 to decrease the quantity of air in proportion to the quantity of fuel delivered to the combustion chamber 1 as the load operating conditions of the engine fall or upon starting of the engine.

It will be understood that the invention is not to be limited to the specific construction or arrangement of parts shown, but that they may be widely modified within the invention defined by the claims.

What is claimed is:

1. The combination in a two-cycle spark ignition gas engine including an exhaust gas turbine driven off the cylinder of said engine, and a blower driven by said turbine, a conduit for conducting the exhaust gases from said engine cylinder to said turbine, a second conduit for conducting air under pressure produced by said blower to said engine cylinder, inlet means for delivering gas fuel to said cylinder, a governor, valve means in the inlet means and operatively connected to the governor for controlling the delivery of gas to the cylinder in response to the operation of the governor, a valve in the second conduit for regulating the quantity of air delivered to said cylinder, a cam operatively connected to the governor, linkage means operatively connected to the cam and said valve to actuate said valve to regulate the quantity of air delivered to said cylinder, and said cam having a land so constructed and arranged that the quantity of air delivered to said cylinder in proportion to the gas and the air-gas mixture will be reduced at and below half load operating conditions of the engine proportionately as the load on the engine is proportionately below half load to provide a suitable air-gas ratio for starting up and at such load conditions of said engine.

2. The combination in a two-cycle spark ignition gas engine including an exhaust gas turbine driven off the cylinder of said engine and a blower driven by said turbine, a first conduit for conducting the exhaust gases from said engine cylinder to said turbine, a plurality of conduits for conducting air under pressure produced by said blower to said engine cylinder, inlet means for delivering gas fuel to said cylinder, a governor, valve means in the inlet means and operatively connected to the governor for controlling the delivery of gas to the cylinder in response to the operation of the governor, a valve for each of said plurality of conduits and for controlling the quantity of air delivered to the cylinder of said engine, linkage means connecting said valves for synchronous unitary operation, a cam operatively connected to the governor, linkage means operatively connected to the cam and to each of said valves to actuate said valves to regulate the quantity of air delivered to said cylinder, and said cam having a land so constructed and arranged that the quantity of air delivered to said cylinder in proportion to the gas and the air-gas mixture will be reduced at and below half load operating conditions of the engine proportionately as the load on the engine is proportionately below half load to provide a suitable air-gas ratio for starting up and at such load conditions of said engine.

References Cited in the file of this patent

UNITED STATES PATENTS

| | | |
|---|---|---|
| 1,076,268 | Carpenter | Oct. 21, 1913 |
| 2,043,296 | Luchsinger | June 9, 1936 |
| 2,117,105 | Schimanek | May 10, 1938 |
| 2,400,247 | Miller et al. | May 14, 1946 |
| 2,608,051 | Nettel | Aug. 26, 1952 |
| 2,714,881 | Bancel | Aug. 9, 1955 |
| 2,780,912 | Miller | Feb. 12, 1957 |